United States Patent [19]
Whittaker et al.

[11] Patent Number: 5,086,427
[45] Date of Patent: Feb. 4, 1992

[54] CLOCKED LOGIC CIRCUITRY PREVENTING DOUBLE DRIVING ON SHARED DATA BUS

[75] Inventors: Bruce E. Whittaker, Mission Viejo; Saul Barajas, Capistrano Beach; Leland E. Watson, Mission Viejo, all of Calif.

[73] Assignee: Unisys Corporation, Blue Bell, Pa.

[21] Appl. No.: 506,392

[22] Filed: Apr. 9, 1990

[51] Int. Cl.⁵ .................................................. H04J 3/02
[52] U.S. Cl. ..................................... 370/85.1; 370/85.2
[58] Field of Search ................... 370/85.1, 85.2, 85.9, 370/85.11, 85.4; 307/239

[56] References Cited

U.S. PATENT DOCUMENTS

| | | | |
|---|---|---|---|
| 4,320,457 | 3/1982 | Tanikawa | 364/200 |
| 4,373,183 | 2/1983 | Means et al. | 370/85.2 X |
| 4,638,181 | 1/1987 | Deiss | 307/239 X |
| 4,639,859 | 1/1987 | Ott | 364/200 |
| 4,668,738 | 8/1984 | Hansen et al. | 364/200 |
| 4,831,358 | 3/1989 | Ferrio et al. | 370/85.1 X |
| 4,847,756 | 7/1989 | Ito et al. | 370/85.1 X |
| 4,847,832 | 7/1989 | Chang et al. | 370/85.1 |
| 4,847,867 | 7/1989 | Nasu et al. | 370/85.1 |
| 4,860,006 | 8/1989 | Barall | 370/85.2 |
| 4,872,161 | 10/1989 | Ichinohe | 370/85.1 |

FOREIGN PATENT DOCUMENTS 2219176  11/1989  United Kingdom ............... 370/85.2

Primary Examiner—Douglas W. Olms
Assistant Examiner—H. Kizou
Attorney, Agent, or Firm—Alfred W. Kozak; Mark T. Starr

[57] ABSTRACT

A system wherein multiple sources of data each have drivers for transmitting data to a common system bus. The drivers are each managed by individual enabling logic which is controlled by a flip-flop driven by a clock. Thus no driver can connect and drive data onto the bus until one clock period after the previously connected driver has been disabled and disconnected from the bus.

2 Claims, 5 Drawing Sheets

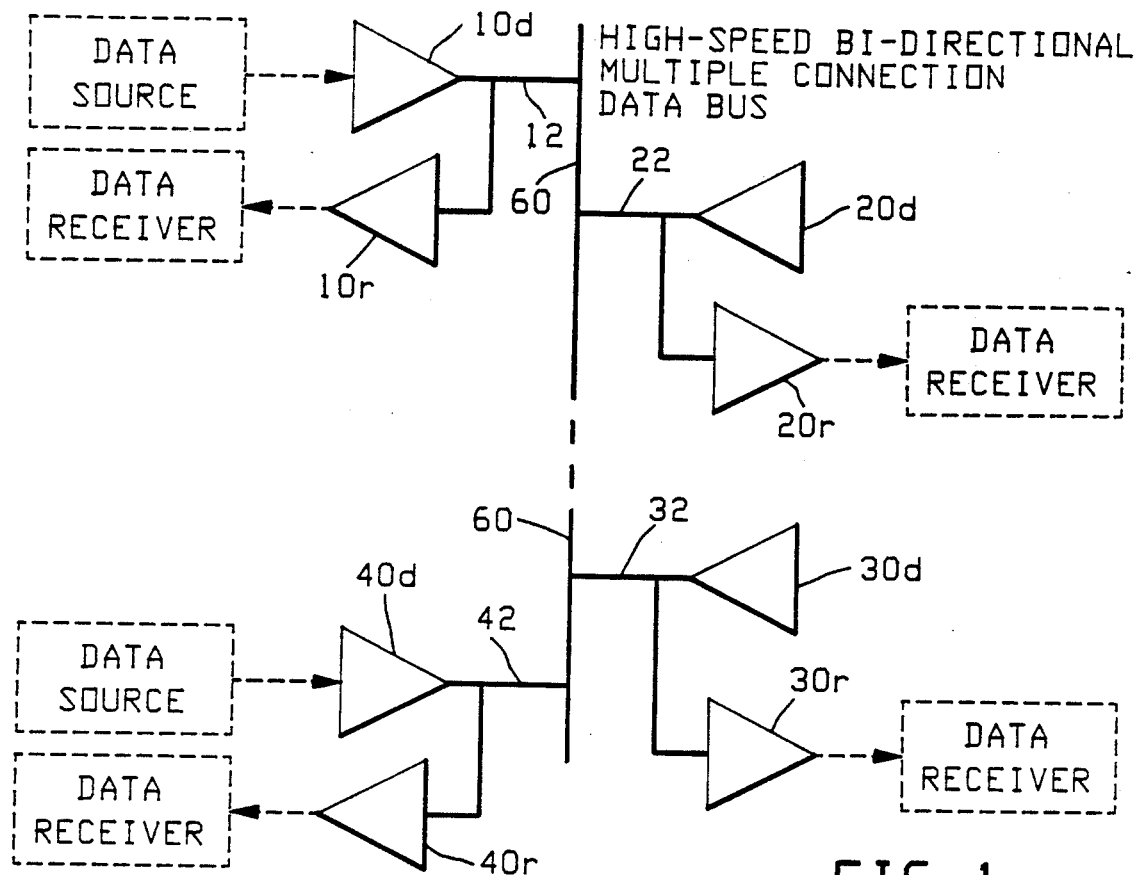
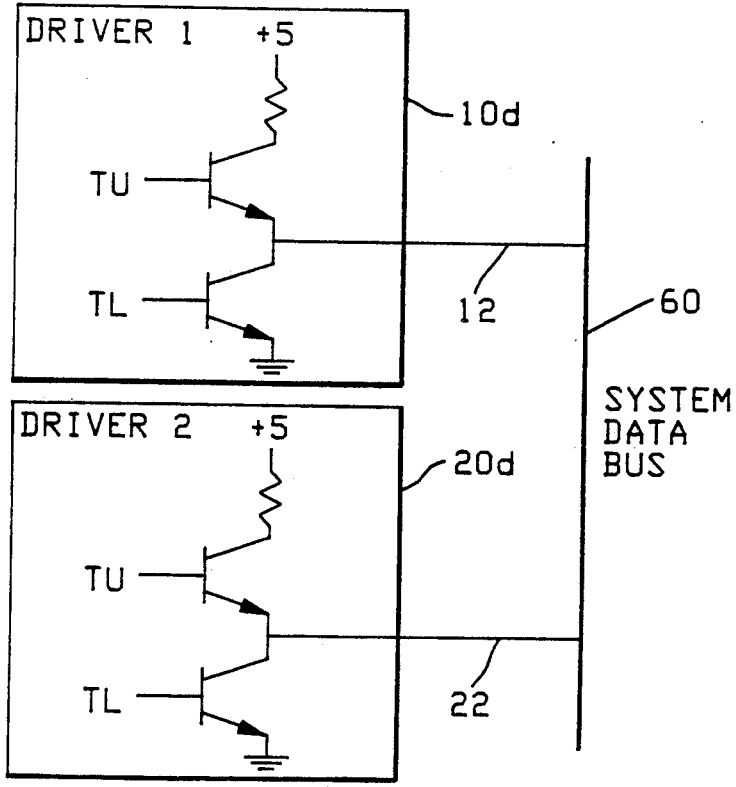
FIG. 1
FIG. 2

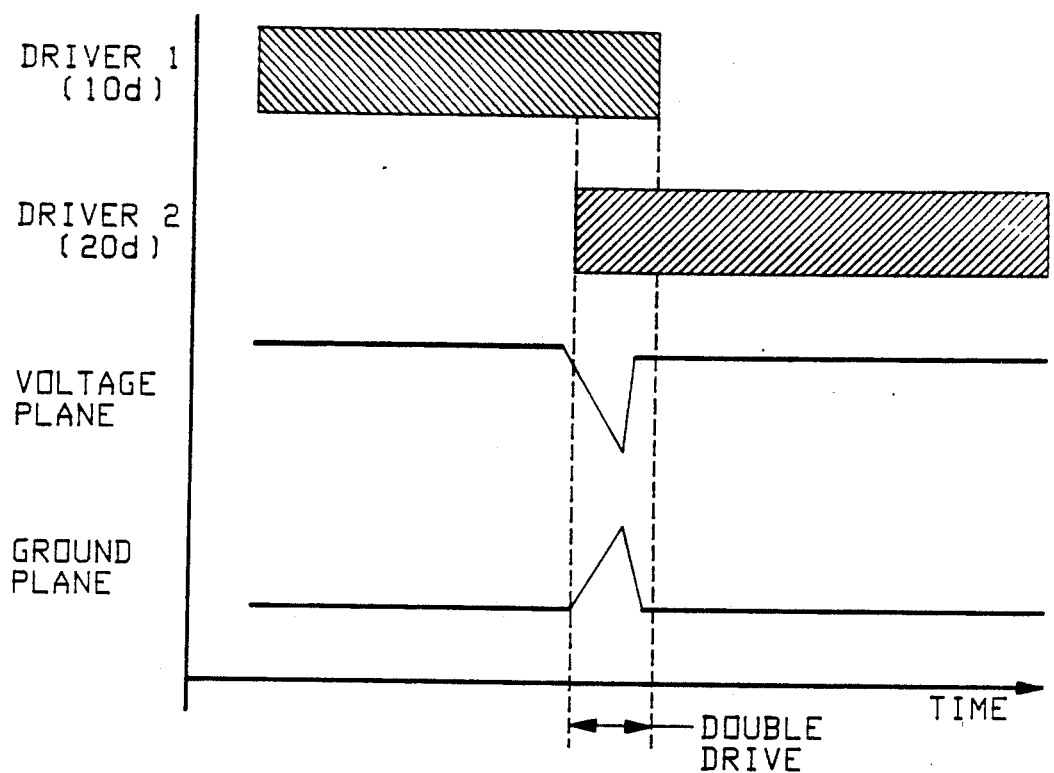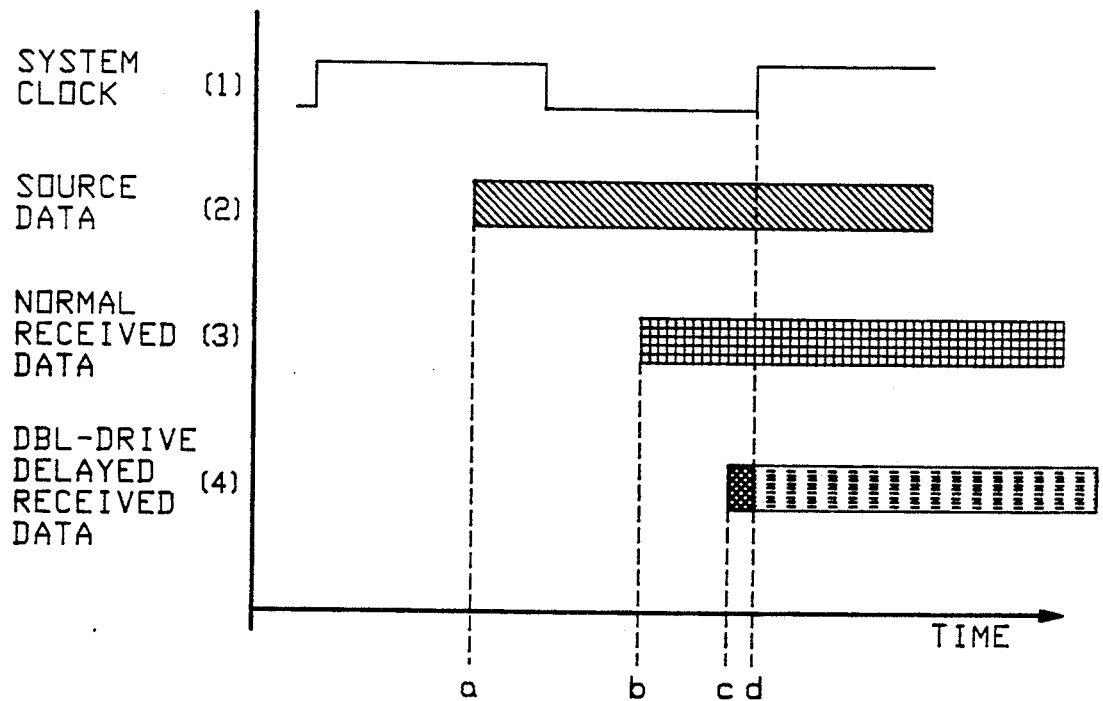

CLOCKED LOGIC CIRCUITRY PREVENTING DOUBLE DRIVING ON SHARED DATA BUS

FIELD OF THE INVENTION

This disclosure relates to the use of protective systems involving computers and/or logic devices where shared data buses require protection from data corruption because of double-drive conditions.

BACKGROUND OF THE INVENTION

A fundamental element of design in digital computers is the use of bi-directional data buses. This system discloses a design to provide reliable data transfer on high-speed digital computer bi-directional buses.

FIG. 1 shows a schematic drawing of a typical digital system bus 60. Modern digital computer systems require wide, high-speed, bi-directional data buses such that the bus 60 of FIG. 1 may, for example, be composed of eight bit lines which would make it a bus of eight bits wide. Likewise, other systems use 16-bit wide buses, and other systems may use 32, 48 and even 64-bit wide buses.

These buses, such as 60, will generally have several data sources and several data receivers on them. Each data source on the bus 60 will use "driver" circuit chips attached to the bus. These are shown schematically as drivers 10d, 20d, 30d, and 40d in FIG. 1.

These drivers, when not attempting to be a transmitting-source of data on the bus, will normally be "tri-stated". The tri-state condition of a driver means that it presents a very high impedance to the bus and electrically appears almost as though it were not present.

When a driver is "enabled" in order to present data onto the data bus 60, it is in its "active" state. In the active state it can "source" or "sink" a large quantity of electrical current. Further, with the present state of the art, the modern bus driver chips such as 10d, ... 40d can switch on and off very rapidly,—for example, within a few nanoseconds.

In FIG. 1, each of the computer resources which use the bus will have its driver, such as 10d, 20d, 30d, and 40d respectively in order to access the bus 60 and to drive data onto it. This is done via the connecting buses respectively, 12, 22, 32, and 42.

Likewise, in FIG. 1, when a computer resource is enabled to "receive data" from the bus 60, it is done by means of the receivers such as 10r, 20r, 30r, and 40r, also through the respective bus connections 12, 22, 32, and 42 which connect to the shared bus 60.

If the situation should arise where more than one driver circuit on the data bus 60 is enabled to drive or dump data onto the bus at the same time, this is called "double drive".

Double drive presents a problem even for extremely small periods of times, even as small as a few nanoseconds, since this can present disturbances to the clean, clear flow of data on the data bus.

As the speed (clock rates) of digital systems increase, the effects of "double drive" become more dangerous to the integrity of data transfer operations. Thus it can be seen that the condition of double drive is a serious problem and requires solutions to enable data transfer with system integrity. The presently described system acts to provide a simple clean-cut and efficiently inexpensive solution to this problem.

The problem can be presented by means of the simplified circuit diagram of FIG. 2 which shows two driver circuits 10d and 20d connected to a common or shared bus 60. It may noted that a data bus may be many bits wide. For example, it is not uncommon to have a 64-bit wide bus for data words.

Since the entire width of the bus (that is to say, each of the 64 lines) is normally switched together at the same time, it may be seen that not one, but many drivers are acting simultaneously in concert, and this provides another conditional situation which amplifies the problem of double drive.

With proper design standards, there is only one driver (that is, one set of source drivers of a bus width) which is allowed to be active on the bus at a given time. As seen in FIG. 2, if a driver is "on", then one of the two transistors (TU or TL) is "on". If TU is on, the driver is putting out a logical "one" (high voltage) onto the bus 60. If TL is on, the driver is putting out a logical "zero" (low voltage-ground) onto the bus.

It will, of course, be observed that if both of the drivers 10d and 20d are "on" simultaneously, and if one driver is putting out a logic "one" and the other driver is putting out a logic "zero", then the TU of the one driver is connected to the TL of the other driver. Thus this situation presents practically a dead short between the voltage source and ground. This will cause a very large electrical current to flow and cause a large current spike, which is the cause of many of the system problems associated with double drive and data corruption on the bus.

It should be indicated that FIG. 2 is merely representative in that there is a separate driver, 10d, for each bit-line of bus 12 so that actually 10d represents an "associated set" of drivers for the various bit-lines constituting bus 12.

Similarly the second driver 20d of FIG. 2 represents an "associated set" of drivers for the bit lines of bus 22 which conveys data to the shared system bus 60. The associated set of drivers for each data source is schematically indicated in FIG. 8 by the set of drivers in dotted lines associated with elements 10d and 20d.

In FIG. 2, it may be noted that each transistor TU and TL operates like an on/off switch. When the transistor TU is "on", then the driver unit, 10d and/or 20d, will output a logical "one".

When the transistor TL is "on", then any one of the drivers, 10d and/or 20d will output a logical "zero".

"Double-drive" occurs when the transistor TU of one driver is "on" at the same time that the transistor TL of another driver is also "on". Thus there is a time overlap of the "on-ness" of one driver such as 10d with another driver such as 20d. This overlapping time period is destructive of the data on the bus 60.

When neither transistor TU or TL is "on", then the driver is put in a condition called "tri-state" which effectively isolates it from connection with the bus 60.

With reference to FIG. 3, there is seen a graph illustrating the "on" time of the first driver 10d and the second driver 20d. Since there is an overlap in the "on" times of each of these drivers, it is seen that a spike occurs in the voltage plane and in the ground plane during the overlap period where the "double-drive" time occurs.

The overlap of the two drivers, being enabled simultaneously, can be of very short duration and yet still induce significant system problems on the data bus 60. FIG. 3 indicates the first of several problems which are caused by double-drive on a system bus.

This first problem can be seen as a significant "glitch" on the system supply voltage (voltage plane) and a corresponding voltage spike on the system ground plane. These glitches are undesirable since they may induce noise into other signals and circuits as they propagate throughout the system, with the net result being a potentially unstable system. Failures caused by these type problems are intermittent and difficult to isolate and fix. Additionally, these type of problems can cause data corruption in a computer system which makes the system totally unacceptable.

A second significant problem which may be introduced by the "double-drive" condition is the effect of "slowing down" of the system bus operation. During the time portion of the double-drive, data on the system bus is not stable or even valid for a receiving element to read. Thus, FIG. 4 indicates a "delay effect" caused by the double-drive condition. Line 1 of FIG. 4 shows the system clock periods of operation. Line 2 of FIG. 4 shows the period of time that source data from a transmittal point or transmittal source is available. Line 3 shows the time period during which data is normally received by a receiving unit. Line 4 indicates the delay of received data due to the double-drive condition.

In FIG. 4 it is assumed that data is received on the active (rising) edge of the clock, at time point "d".

The time period (a–b) is the normal propagation delay of the bus signals over the system bus.

The time period (b–d) is the time between the receipt of the data at the receiver and the next rising clock edge. This time is the safety margin for the received data. The receiving device will have a "set-up" time. (For some devices, one example being certain CMOS chips, the set-up time on signals is as great as 45 ns.) However, the safety margin must exceed the receiver's set-up time. For proper system design, the worst case signals and devices must be the design criteria.

In FIG. 4, the time period (b–c) is the additional delay on the received signal caused by the double drive. Comparing to FIG. 3, this time period is the time of the glitch and its settling down time. The double drive has caused the bus data to effectively arrive (in a stable condition to be read) at time (c) instead of time (b). It can be seen, therefore, that the "safety margin" time for the receiver has been reduced from (b–d) to (c–d). If (c–d) is now less than the required set-up time of the receiving device, reliable data will not be received.

In modern high-speed computer systems, higher performance is achieved in part by making the clock speeds higher. This causes the clock period to be shorter, thus allowing less time for signal information and bus information to be propagated between logical sections of the system. And strictly by the nature of high-speed transmission lines, data buses require time in order to transmit a stable signal. Double-drive conditions increase the bus transmission time by at least a duration of the "drive overlap" between any two of the resource units connected to the bus. For efficiency purposes, this double-drive delay may put the bus delay over the limit and thus cause "bad" or corrupted data to be read by a receiving resource unit.

A third problem which may be introduced by the double-drive condition is the long term reliability of the bus drivers, such as 10d, 20d, ... 40d, etc. If the time period of the double-drive is too long, the drivers may actually be destroyed by the very high current coursing through them. But even short of this extreme situation, the more likely problem is that the short, very high current spikes will shorten the life of the driver chips. And this, of course, lowers the long term stability and reliability of the system.

Thus it can be seen that certain serious and undesirable results can be induced because of the double-drive condition. In some past system designs, the double-drive condition could often be easily ignored because (1) the clock rates were slower and thus allowed longer propagation and settling times; (2) the driver circuits were switched more slowly and thus sloppy logic design was masked by slow switching devices; and (3) very expensive voltage distribution schemes with very heavy copper voltage planes and extensive decoupling circuits were used in these older systems.

These mitigating influences are no longer available and valid for systems. The present day logic designer must prevent double-drive, in today's systems, through careful design techniques. Thus the present system provides a solution which prevents the various intermittent data problems which used to be simply ignored or solved by very expensive voltage/ground plane support systems.

Another situation that occurs is that of the usage of a variety of different types of drivers which have different switching times. FIG. 5 shows a system bus 60 with three different types of driver circuits. Each of the driver circuit units 10d, 20d, and 30d are of a different circuit type. This variety becomes very typical as each type meets a different need.

The first driver 10d (74FCT245 such as designated by Fairchild Semiconductor Company of 333 Western Ave., So. Portland, Me. 04106) is a bi-directional transceiver which allows data transfers in and out using a single chip type. The second driver 20d (CMOS VLSI device) is a CMOS VLSI chip type. These are custom chips unique to certain specific designs. The third driver, 30d (74ACT373) is a latch driver which holds data which is to be driven onto the bus 60. There are other possible driver types that also could be used but these are illustrative. It is worthy of notice to see that this variety of types of driver devices can increase the problem of double-drive conditions.

As seen in FIG. 5, the first driver 10d has a minimum switching time range of 1.5 nanosecond and a maximum switching time range of 9.5 nanoseconds. The second driver 20d has a minimum switching time range of 4 nanoseconds and a maximum switching time range of 40 nanoseconds, while the third driver 30d has a minimum time switching range of 1.0 nanoseconds and a maximum time switching range up to 11 nanoseconds. Thus each driver circuit type has a different switching time characteristic. For some chip technologies, the range of the switching times is very broad. This makes "predicting" the time a driver will go "on" or go "off" of the bus 60, to be an inexact situation.

FIG. 6 shows an example of two drivers which are enabled/disabled at the exact same instant of time and yet may still cause a considerable spike of double-drive condition due to the switching time differences. As seen in FIG. 6, the first or top line shows the first driver switching from "off" to "on" to turn onto connection with the bus 60. Likewise, the second driver (shown on line 3) is transitioning from "on" to "off" in order to disconnect from connection with the bus 60. It is seen that the time period (a–b) is the switching time for the first driver to position from its "off" position to its "on" position in order to connect to the bus. The actual switching may occur anywhere within the time period between between a to b.

Likewise, (on the fourth line) it is seen that the second driver, which is switching from "on" the bus to "off" the bus, has a time period (a–c) which presents a time lag where it is unknown at what actual instant the disconnection will occur. Thus it is seen that the time period (a–b) is a period of uncertainty in which two of the drivers are in the process of transitioning and double drive problems can occur since both drivers may still be connected to the bus 60.

In addition to the variety of different driver circuit types, there occur the differences in the generation of the various "driver enable" signals which control the driver circuit units. Each driver signal has a unique group of logic functions within it. It also must propagate over its own unique logic path. Thus each driver is implemented in its own unique group of logic devices. These provide factors which combine to make exact control of the driver chips somewhat difficult to predict.

FIG. 7 shows an example where the switching times of two drivers are assumed to be "instantaneous". But since the "enable" signals are actually different in time-occurrence, this also introduces the possibility of a double-drive condition.

For example, in FIG. 7, when the first driver is transitioning from "off" to "on", it must be initiated by the enable 1 signal shown in the top line of FIG. 7. Thus, at time (a) the first driver turns "on". Now when it is desired for the second driver to transition from the "on" to the "off" condition, it is seen that the enable 2 signal has a longer operation time (line 3) and does not operate until the time point b in order to turn off the second driver. Thus the time period (a–b) is the delay time of the enable 2 signal. Thus a condition is provided during the time period (a–b) where there is a possible double-drive condition.

By observation of FIG. 7, it can be deduced that one part of the solution to the double-drive problem is to always have a situation where the driver which is turning "off" precedes the driver which is turning "on". That is to say, the disconnection of a driver from the bus 60 should occur "before" the actual connection of the other driver onto the bus 60.

SUMMARY OF THE INVENTION

In order to insure that there will be no overlapping of time periods between the cut-out of one driver to the system bus and the turn-on of another driver onto the system bus, there is provided a system of circuitry wherein each driver circuit "enable signal" is controlled by a clocked logic device, such as a flip-flop. This will insure that drivers are taken "off" (disconnected from) the bus before any other drivers are allowed to be "on" (connected to) the bus, and thus there will be no situation of double-drive occurring.

This type of system solution makes the assumption that the driver switching times and the "enable propagation" times are much less than the system clock period, and this is a generally valid assumption in the majority of system networks.

Thus, by using control gating logic and a flip-flop to regulate the enable signal for a first driver, and also control gating logic and flip-flop to regulate the enable signal for the second driver, it is possible to manage these regulators, via the system clock, so that there can be no simultaneous occurrence of connection of the first driver and the second driver to the same system bus. This will prevent data loss and/or data corruption from the system bus.

BRIEF DESCRIPTION OF THE DRAWINGS

FIG. 1 is a schematic diagram of a typical digital system.

FIG. 2 is a diagram of a driver circuit.

FIG. 3 is a graph illustrating double drive.

FIG. 4 is a graph illustrating transmitter and receiver timings.

DESCRIPTION OF PREFERRED EMBODIMENT

Figure 8:
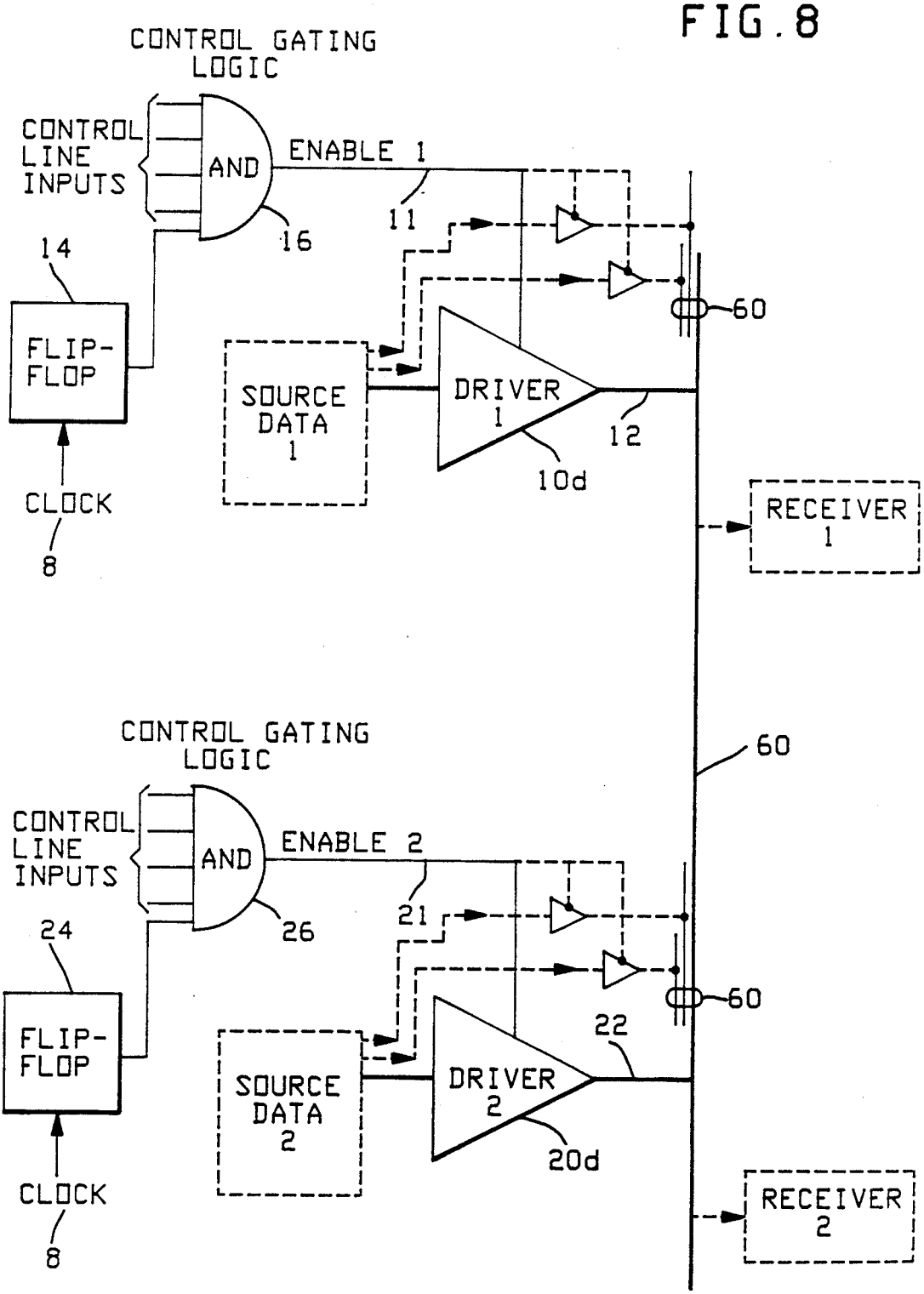
FIG. 8 is a circuit diagram of an exemplary embodiment of the invention.

Referring to FIG. 8, there is shown a circuit drawing which illustrates the "clocked logic solution" which is applicable for the prevention of the double-drive condition on a system bus.

In FIG. 8 there is seen the standard driver 10d connected via bus 12 to the system bus 60 and also the second driver 20d connected to the system bus 60 by its output bus 22. This FIG. 8 is only representative of the actual circuitry since, for example, bus 12 constitutes a plurality of bit lines where each bit-line has a driver, its individual control gating logic, and a common flip-flop (enabling all drivers in that bus-group) all driven by a common clock circuit 8. For example, a 64-bit bus would have 64 drivers and 64 control gating logic units but only one flip-flop for the entire 64 drivers.

In FIG. 8 there is seen the enable 1 line, 11, which is connected to enable the first driver 10d. Likewise, the enable 2 line, 21, is connected to regulate and enable the second driver 20d.

The first enable line 11 is the resultant output of the AND gate 16 which has a number of inputs in addition to an input from the flip-flop unit 14. The flip-flop unit 14 is regulated by the clock signal 8. Similarly, the second enable line for the second driver 20d is the resultant output of the AND gate 26 which also has certain control line inputs in addition to an input from the flip-flop 24, and wherein the flip-flop 24 is regulated by the same clock signal 8.

The inputs to the AND gates 16 and 26 would use logic that permits the enablement of only one gate (16 or 26) at a given time period. These inputs would also carry an instruction to cause an "enabled" driver to drive source data onto bus 60.

Figure 5:
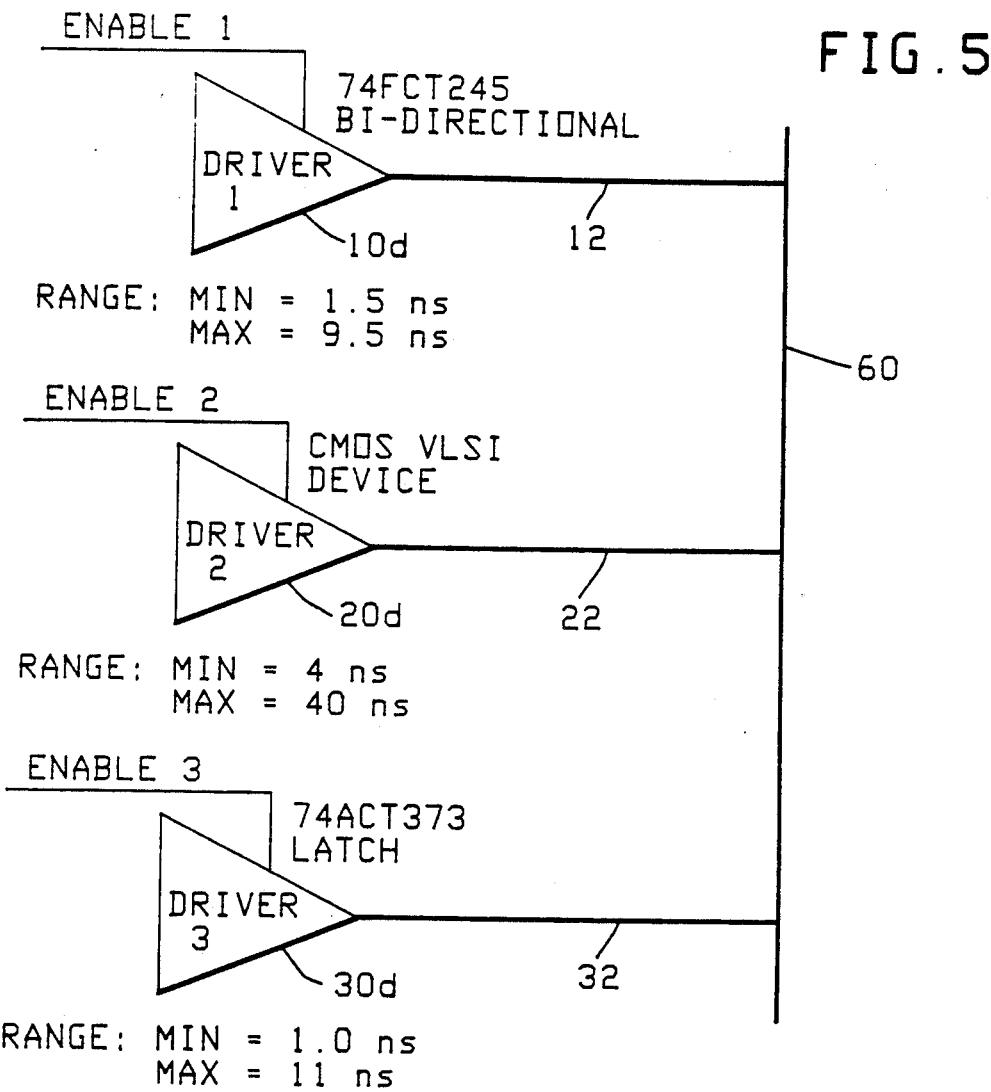
FIG. 5 is a diagram of a system bus with different driver circuits.
Figure 6:
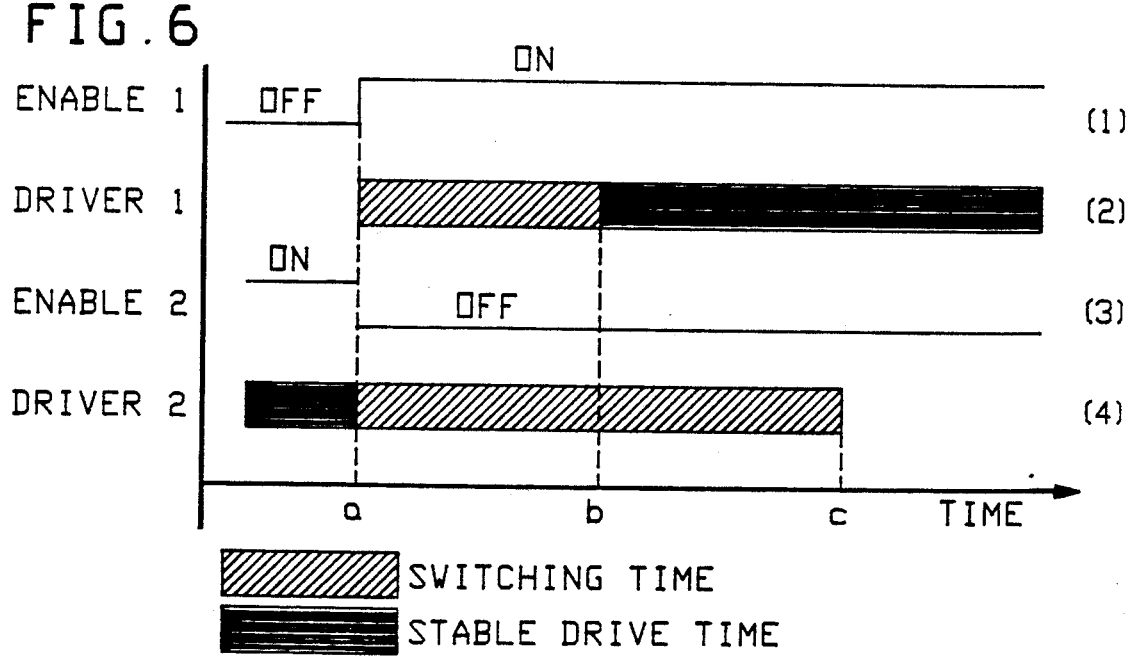
FIG. 6 is a graph illustrating different switching times for different driver circuits.
Figure 7:
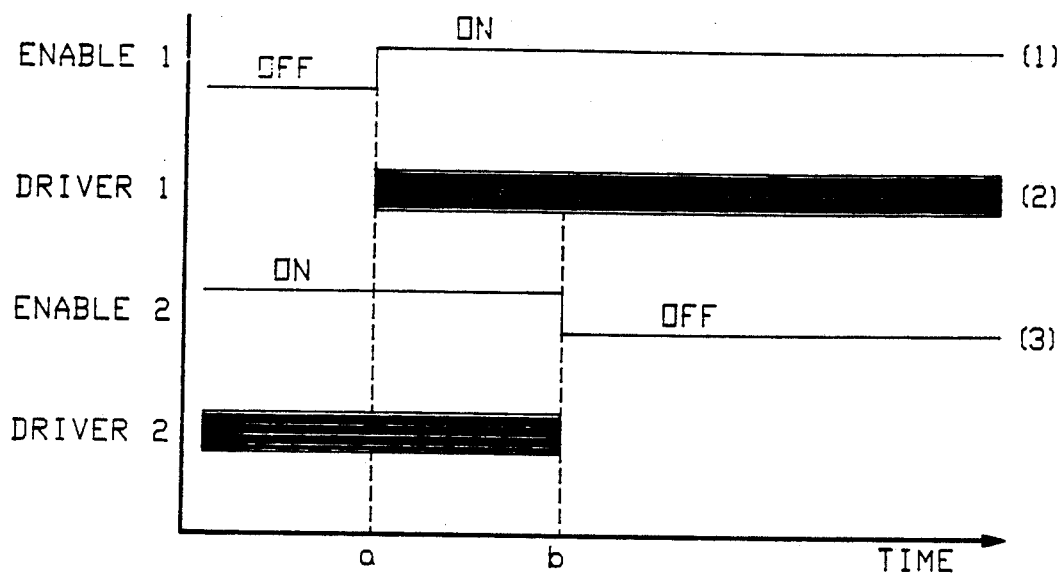
FIG. 7 is a graph illustrating timing difference of enabling signals.
Figure 9:
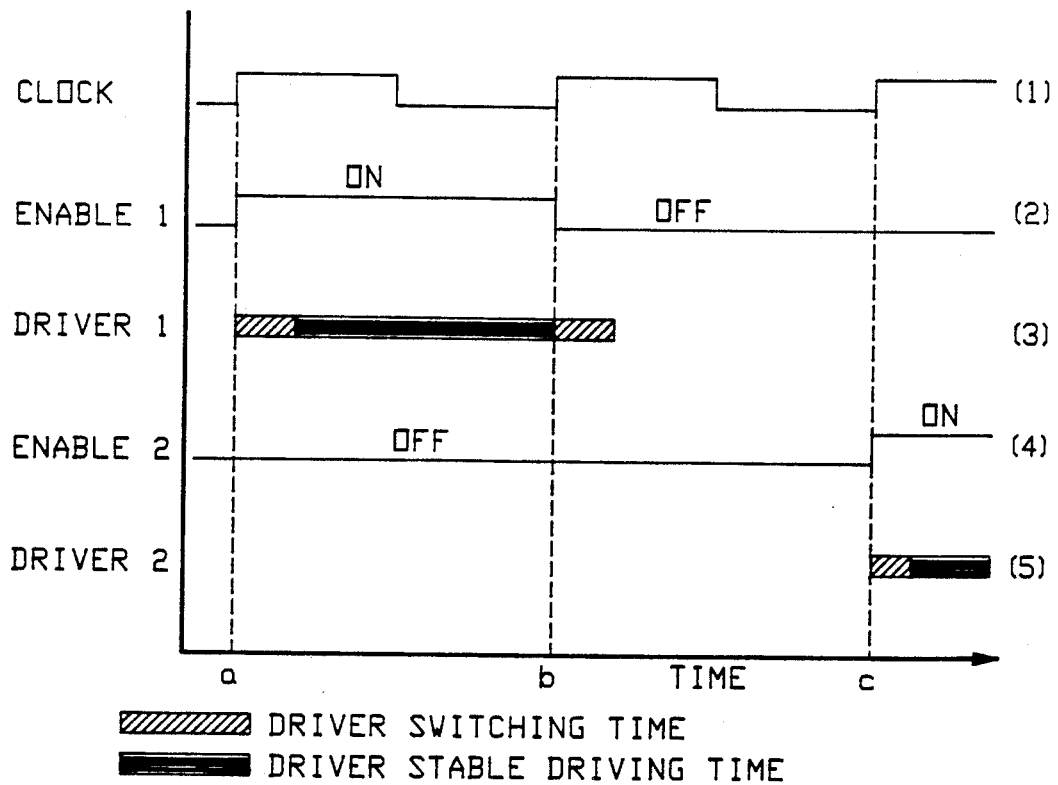
FIG. 9 is a graph illustrating the timing of the drivers of FIG. 8.

This clocked logic solution for preventing double-drive is illustrated in FIG. 9. FIG. 9 shows the basic clock signal 8 at the top line (1) of the graph. Line (2) shows the first enable signal of output line 11 (FIG. 8) in relationship to the clock signal. Line (3) of FIG. 9 shows the switching time involved for the first driver 10d where the diagonal lines indicate the driver switching time and the blackened solid-covered area indicates the driver stable driving time.

Line (4) of FIG. 9 indicates the second enable signal condition of output line 21 (FIG. 8) which regulates the second driver 20d. Then line 5 of FIG. 9 indicates the second driver, 20d, switching time while showing the initial settling switching time involved (by means of the shaded diagonal line) and the stable connection driving time which is shown by the solid blackened covered area, of line (5) in FIG. 9.

The clocking logic 16 and 26, FIG. 8, acts upon the "active" edges of the system clock. In FIG. 9 at the clock time (a), the first enable signal occurs as the flip-flop 14 turns "on" due to the clock action. At the time period (a-b) the first driver unit 10d drives (connects to) the bus 60. At the time period (b), the first flip-flop 14 turns "off" but it is noted that the first driver 10d does not immediately respond since there is a small time lag as seen in line (3) of FIG. 9.

In FIG. 9, the time period (b-c) is called the "dead" clock time since the first enable signal from output line 11 is turned "off" while at the same time the second enable signal on line 21 is also "off". So that nothing is happening during the clock signal time (b-c) of line (1).

At the time period (c), the second flip-flop 24 turns "on" because of the clock signal from output line (1). Again it is noted that there is a time lag of the second driver unit 20d, as seen in line (5) of FIG. 9 since there is a period required for the actual switching to take full effect before stable line connection to the bus takes place as shown by the solid blocked area. Then, sometime after the time period (c) and the full switching of driver 2 is complete, the second driver 20d can now reliably drive its data onto the bus 60.

It will be noted that this particular system causes a "dead" clock period between each change of driver operation on the system bus. However, this is a very safe solution but obviously in a certain sense may introduce a performance degradation due to the fact that data is only on the system bus every other clock period. But as long as a portion of the "dead" clock time can be tolerated, then this particular system handling could always be used for bus control switching in order to avoid any semblance of double-drive conditions.

Described herein has been a double drive protection system wherein multiple data sources and drivers connect to a system bus for data transfer but no two drivers can be simultaneously connected to drive data onto the bus; and further, no driver can connect to or drive onto the bus until after the previously connected driver has disconnected from the bus by at least one clock period. Thus there is prevented any double driving of data onto the bus which could cause data corruption.

While the system has been described in its preferred embodiment, other embodiments may also apply the described preventive concept which is defined by the following claims.

What is claimed is:

1. In a digital computer system where multiple digital data sources can be connected to transmit data onto a common system bus made of "k" bit lines, a bus access and double drive prevention system comprising:
(a) a plurality of digital data source units each of which includes:
  (a1) plurality of driver means for driving data onto said system bus, each said driver means including:
    (a1a) a set of "k" driver units for each set of bus bit lines for each said data source units;
  (a2) a plurality of means for enabling system bus access to only one of said set of "k" driver units during any given clock cycle, wherein each said means includes:
    (a2a) control gating logic means for enabling a selected one of said plurality of digital data source units while disabling all other digital data source units, and wherein each said control gating logic means includes:
      (a2ai) an AND gate which is connected to enable or disable its associated set of driver units;
      (a2aii) a flip-flop circuit connected as an input to said AND gate;
      (a2aiii) clock means connected to transmit clock signals to said flip-flop circuit.

2. In a digital computer network using a plurality of data source for transmitting data over a shared system bus to a selected one of a plurality of receiver units, a bus access and double drive prevention system comprising:
(a) a plurality of data source modules connected to said system bus wherein each of said modules includes:
  (a1) a digital data source unit for holding digital data to be transmitted;
  (a2) a set of driver units for moving digital data from one of said data source modules onto said system bus, said set of driver units providing one driver unit for each bit line of said bus;
  (a3) gating logic means for enabling one of said data source modules to transmit data onto said system bus one clock cycle after all other data source modules have been disabled from transmitting data onto said system bus, said gating logic means including:
    (a3a) a control logic unit connected to enable/disable said set of driver units wherein said control logic unit includes:
      (a3ai) flip-flop circuit means for clocking an associated AND gate at a clock rate determined by a clocking means;
      (a3aii) said clocking means connected to drive a clock signal to each one of said flip-flop circuit means;
      (a3aiii) said associated AND gate including input instruction signals for enabling/disabling its associated set of driver units to permit/inhibit data transmission onto said system bus.

* * * * *